Oct. 4, 1966    JAMES E. WEBB    3,276,726
ADMINISTRATOR OF THE NATIONAL AERONAUTICS
AND SPACE ADMINISTRATION
INFLATION SYSTEM FOR BALLOON TYPE SATELLITES
Filed July 16, 1965    5 Sheets-Sheet 1

INVENTORS
John M. Thole
Wallace S. Kreisman &
Robert M. Chapman

BY

ATTORNEYS

Oct. 4, 1966

JAMES E. WEBB
ADMINISTRATOR OF THE NATIONAL AERONAUTICS
AND SPACE ADMINISTRATION
INFLATION SYSTEM FOR BALLOON TYPE SATELLITES 3,276,726

Filed July 16, 1965

INVENTORS
John M. Thole
Wallace S. Kreisman &
Robert M. Chapman
BY
ATTORNEYS

INVENTORS
John M. Thole
Wallace S. Kreisman &
Robert M. Chapman

ATTORNEYS

Oct. 4, 1966
JAMES E. WEBB
ADMINISTRATOR OF THE NATIONAL AERONAUTICS
AND SPACE ADMINISTRATION
INFLATION SYSTEM FOR BALLOON TYPE SATELLITES
3,276,726
Filed July 16, 1965
5 Sheets-Sheet 5
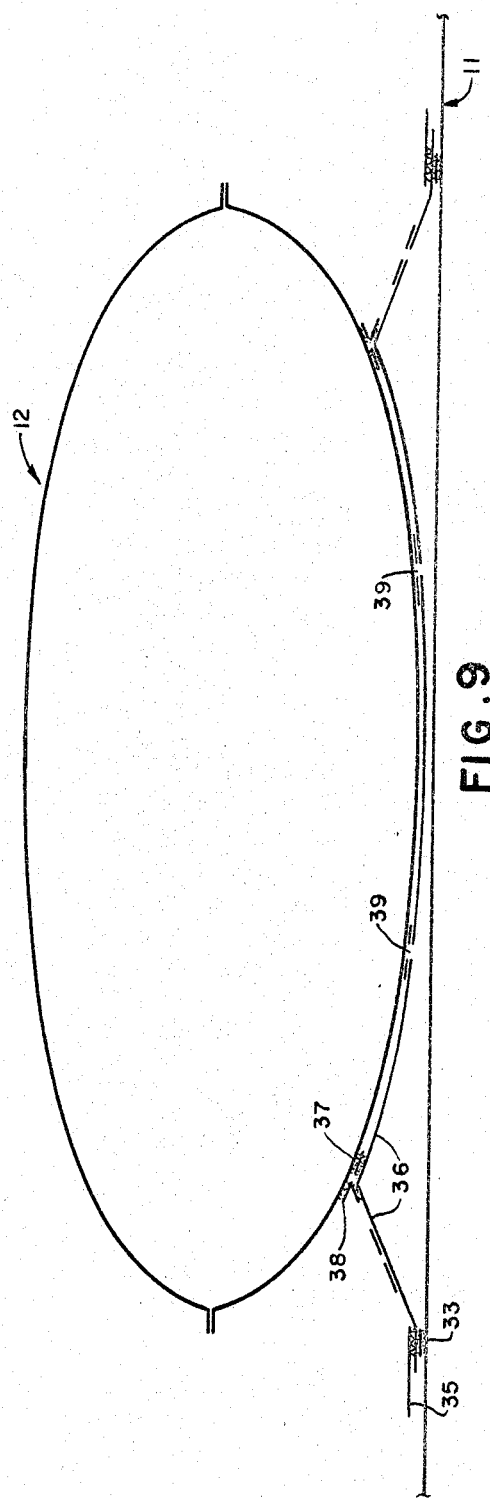
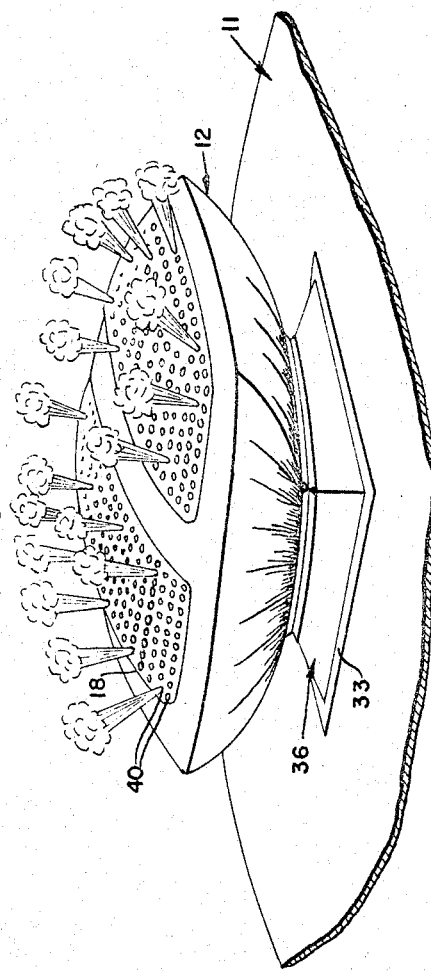
INVENTORS
John M. Thole
Wallace S. Kreisman &
Robert M. Chapman
BY
Earl Levy
ATTORNEYS

United States Patent Office 3,276,726
Patented Oct. 4, 1966

3,276,726
INFLATION SYSTEM FOR BALLOON TYPE SATELLITES
James E. Webb, Administrator of the National Aeronautics and Space Administration, with respect to an invention of John M. Thole, Wallace S. Kreisman, and Robert M. Chapman
Filed July 16, 1965, Ser. No. 472,747
15 Claims. (Cl. 244—31)

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The invention relates to a means for inflating balloon type satellites in an orbital environment, and, more particularly, to a novel means and method of packaging chemicals so that gases generated therefrom can be furnished, in a controlled fashion, to inflatable space structures, such as Echo type communication satellites and space inflatable antennas, in a manner such that a safe and reliable deployment and pressurization of the structure is achieved.

Large pressurized balloons have been and are being developed for carrying out experiments in outer space and also for performing as communication relay stations, etc. By necessity, these balloons must be flexible, lightweight and have a proper inflation system. In particular, the inflation system must supply a pressure sufficient to stress the skin of the balloon structure to make it smooth and/or to stress the skin beyond it yield point so that a permanent set in the skin can be established, yet, at the same time, low enough so that it will not exceed the ultimate tensile strength of the material of the skin. The pressure must also be applied gradually to avoid rupturing the balloon instead of merely stretching the skin. It is important to note that the pressure is used only to establish a smooth surface and/or to produce a permanent set of the balloon and not to maintain the shape thereof. Accordingly, once the balloon's skin is extended to a permanent set, the pressure is no longer required for maintaining the shape of the balloon.

At least two different methods have been used in the past to inflate balloon type satellites. In one of these methods, a tank of compressed gas is used to inflate the balloon before the latter is detached from the last rocket stage. This method is not very efficient since a heavy cylinder must be used to contain the gas, and a special valve must be properly detached from the balloon after inflation. While this method, in some instances, has proved practical for structures of small volume, it is very impractical for structures of large volume, such as for the Echo I and Echo II satellites.

In the second method that has been used, particularly, when the pressure requirements of the satellite are small, a chemical, whose vapor is to be used to pressurize the balloon, is prepared in a fine powder form and sprinkled uniformly on the inner surface of the balloon fabric (skin). The balloon is thereafter folded and packed in its canister which is then pumped, by vacuum pumps, to remove as much air as practical from the inside of the folded balloon. This method was used for the Echo I satellite with the pressurization requirements thereof being met by benzoic acid which has a vapor pressure at room temperature of approximately .003 millimeter of mercury. It proved adequate in this use because the pressurization requirements of the satellite were quite modest.

A similar method was tried on the first suborbital flight of the Echo II program. However, since Echo II was fabricated from a stiffer material than Echo I, it required a higher vapor pressure from the sublimation material than was used in Echol I. The sublimation material used in this case was acetamide having a vapor pressure at room temperature of approximately .015 millimeter of mercury. This flight resulted in a catastrophic rupture with the balloon structure being destroyed in less than one second after ejection from the canister in the space environment.

In the use of the latter method, there is danger that large amounts of water may be adsorbed by the powdered chemical during the preparation stage since it is impractical economically to control environmental conditions during the application of the powder to thousands of square feet of balloon fabric. In addition, the finely powdered chemical has a tremendous surface area and would thus have a high rate of sublimation when exposed to a vacuum and solar environment of space. The rapid sublimation and/or release of water vapor and other impurities can cause a very rapid acceleration of the balloon fabric to the point where the load carrying capability of the fabric is exceeded. These conditions are to be avoided in the design of an inflation system for any large diameter inflatable satellite like the Echo II.

Subsequent to the suborbital flight, the pressurization requirements of the Echo II structure established the need for the use of sublimation materials capable of developing higher pressures than even that used in the above referred to suborbital flight. The required vapor pressure of the sublimation material was determined to be approximately .220 millimeter of mercury. This meant that a new method had to be devised to allow the safe and reliable deployment and pressurization of large diameter space inflatables like the Echo II satellite.

Accordingly, it is an object of the present invention to provide an improved lightweight inflation system for a balloon type satellite.

It is another object of the present invention to provide a simple and highly reliable method and device for supplying a controlled pressure to a balloon type space vehicle.

It is a further object of the present invention to provide a pressure system capable of sensing the need for pressure to be applied to a balloon type space vehicle and then being able to apply the pressure at a controlled rate.

It is still another object of the present invention to provide an inflation system for a balloon type satellite that is compatible with the structure of the balloon and which can be readily stored therein.

It is still a further objective of the present invention to provide a means for initiating balloon pressurization as a function of the physical environment of the balloon, such as temperature and/or pressure.

It is another objective of the present invention to provide an inflation system of inflating packages which will not accelerate the initial deployment of the balloon.

It is a further objective of the present invention to provide a balloon inflation system comprising sealable inflation packages containing a chemical material for releasing vapor upon the seal being broken.

The new method and novel structure, which will be described in detail hereinafter, for accomplishing these and other objects have been experimentally tested in the Echo II satellite. Essentially, the invention comprises the packaging of a chemical to be sublimated in a large number of individually sealed inflation packages which are distributed over the inner wall of a ballon type satellite. The sealed inflation packages contain thin wafers of the chemical to be sublimated, with the wafers being sandwiched between a vapor tight plastic sheet and a perforated plastic filter which serves to control the rate of vapor flow from the package. The inflation package is folded in wallet like fashion and sealed on three sides with either wax, grease or cement. Inside the sealed inflation package, in addition to the chemical to be sublimated and the filter that controls the flow of vapor, there is a special opening device which can be described as a "gas spring" or an inflation pillow. This device comprises a closed, sealed package containing either a gas, a vapor, or a sublimation compound. By the action of the inflation pillow and thermally sensitive wax being used as the package sealant, the opening of the inflation package can be controlled so that the vapor therein can escape and pressurize the balloon, at an appropriate time (after the balloon has been initially deployed in sun light by the residual gas which inevitably remains after the balloon has been folded and packed).

The exact nature of this invention, as well as other objects and advantages thereof, will be readily apparent from consideration of the following specification relating to the annexed drawings, in which:

FIGURE 9 is a side view of an inflation package connected to the balloon after inflation of the inflation pillow; and FIGURE 10 is a perspective view of an opened inflation package having the vapor escaping from the sublimation chemical contained therein and passing into the balloon.

Figure 1:
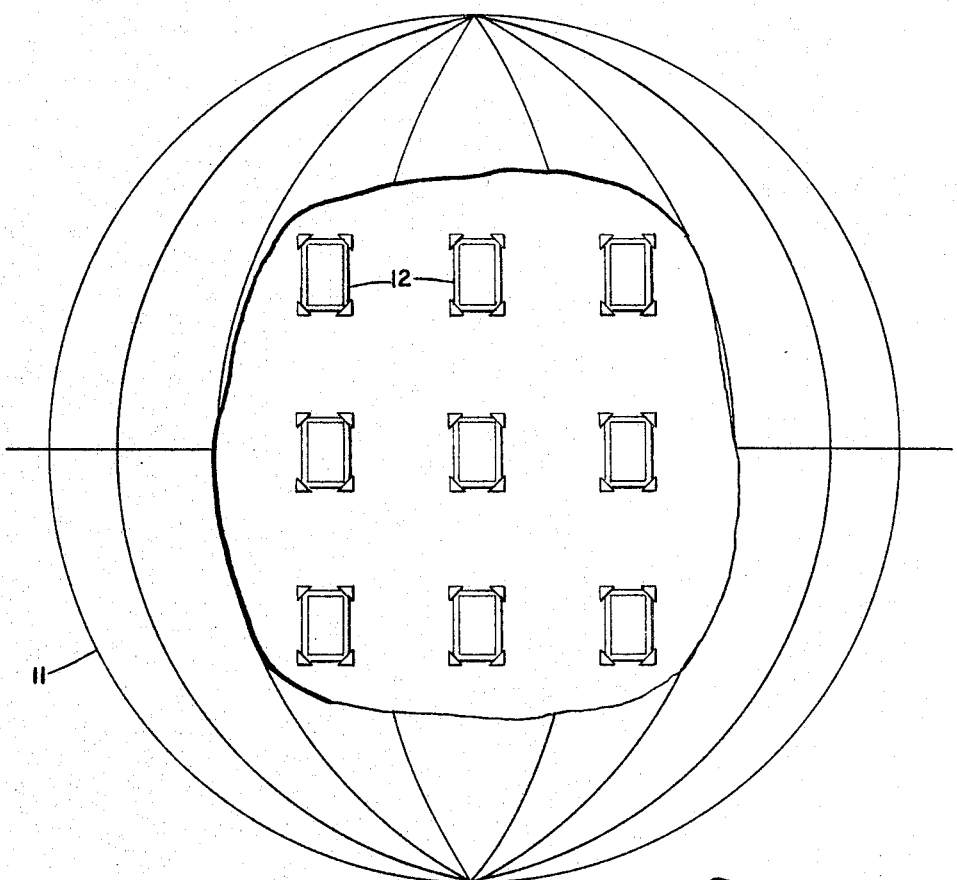
FIGURE 1 illustrates a plurality of inflation packages of the instant invention secured to the balloon with the balloon deployed by the residual gas existing there within.

Referring now to the figures, wherein the same reference numerals are used to identify like parts throughout the different figures, there is shown in FIGURE 1 a balloon type satellite 11 which has been ejected from its capsule in outer space and thereafter has been partially deployed by residual gas existing in the balloon structure. Attached to the inner surface of balloon 11 are a plurality of inflation packages 12 of the type that will be described in detail hereinafter. In a short time, these inflation packages 12 will open up and allow vapor to be released from a sublimation chemical contained therein. This vapor, in a controlled manner, pressurizes the balloon sufficiently so that the skin thereof takes a smooth permanent set.

STRUCTURE

Figure 2:
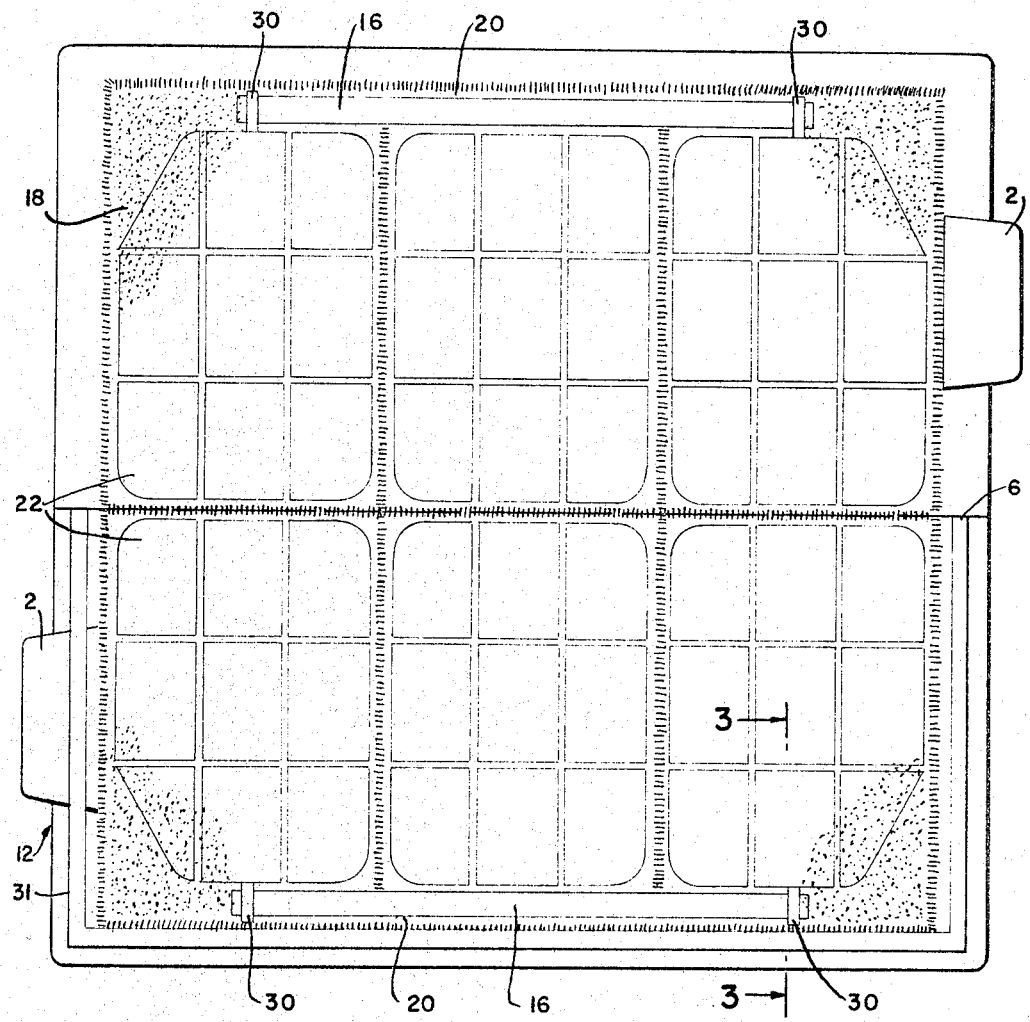
FIGURE 2 is a top view of an inflation package showing the placement of the sublimation wafers therein.
Figure 4:
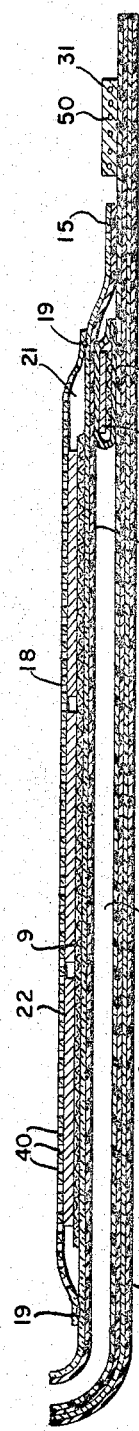
FIGURE 4 is a cross sectional view, of one half of inflation package of FIGURE 2 slightly modified.
Figure 3:
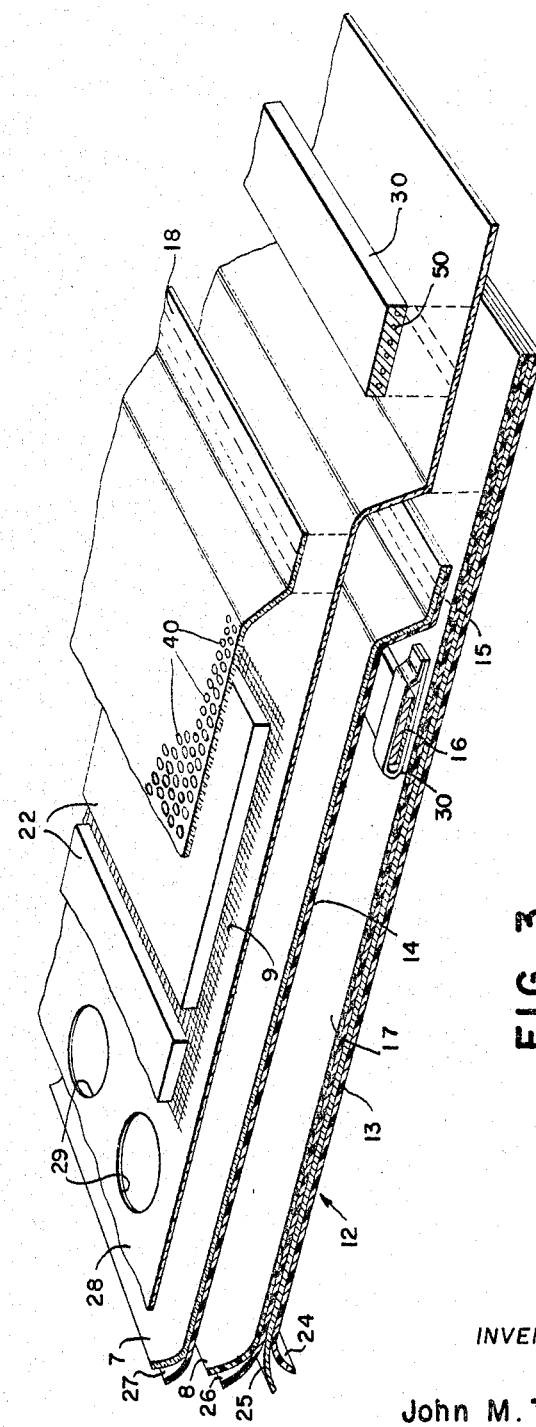
FIGURE 3 is an exploded, cross sectional, perspective view, taken along line 3—3 of FIGURE 2, of a simplified embodiment of the inflation package.

A simplified structure of the inflation package 12, comprising essentially two sheets of flexible non-porous plastic and one sheet of flexible perforated plastic, is shown in FIGURE 4. FIGURES 2 and 3 illustrate substantially the same structure as FIGURE 4 but with the exception that a third flexible, non-porous plastic sheet, with relatively large holes therein, is used in the formation of inflation package 12.

Referring now particularly to FIGURE 4: A large non-porous plastic sheet 13 serves as the outer envelope of the inflation package 12, and a smaller non-porous plastic sheet 14 has its extremities 15 heat welded to the inside of the plastic sheet 13. The sealed, vapor tight space 17 between these two non-porous plastic sheets 13, 14 is filled with either a gas such as Freon–12, etc., on an activator chemical strip 16, such as para-dichlorobenzene reinforced with glass scrim, which produces a vapor of sufficiently high pressure at a desired operating temperature. A polyethylene strap 30 retains strips 16 to the inside of plastic sheet 13. The portion of inflation package 12, so far described, forms a "gas spring" or inflation pillow 17.

A perforated plastic sheet 18, perforated with holes 40, is heat welded or otherwise sealed at its extremities 19 to the outside of plastic sheet 14. The attachment of this sheet forms a spacing (inflation material compartment) 21 between itself and the plastic sheet (inner envelope) 14 of the inflation pillow 17. Within this spacing 21 are located wafer shaped sublimation chemicals 22 reinforced with glass scrim 9. The perforated plastic sheet is made of clear polyethylene which is essentially transparent to infrared radiation. This is necessary to enhance the heat flow into the subliming material. Perforated sheet 18, in addition, acts as a vapor filter, which by the selection of the size of holes 40 therein acts to control the rate at which vapor from the sublimation wafers 22 leave the inflation package 12 after it has been opened.

While no doubt the inflation package 12 can be fabricated in numerous ways and with various types of material, in a proven embodiment, as shown in FIGURE 3, the non-porous outer plastic sheet 13 is composed of a four layer laminate of 1.2 mil black polyethylene 24 for thermal control, 0.5 mil aluminum foil 25 for control of permeability, 0.5 mil Mylar 26 for strength, and 1.2 mil balloon grade polyethylene 8 for heat sealing; and the non-porous inner plastic sheet 14 is made of an outer layer of polyethylene 27 and inner layer of Mylar 7 to form a 1.5 mil Mylar-polyethylene laminate material such as Scotchpak.

The black polyethylene 24, by having emissivity of approximately 0.8, enables the transfer of infrared energy from inside balloon 11 to the activator chemical 16, after initial deployment of the balloon by the residual gas, so that the activator chemical 16 sublimes and inflates the inflation pillow 17. The activator chemical strip 16 is located as shown, so that it does not increase the thickness of the inflation package 12. By this construction the height of the folded balloon will not be additionally increased.

The aluminum foil 25 provides a barrier to the permeation of gases and vapors into an out of the inflation package 12. In this manner, external molecules of air and water vapor will be prevented from entering the inflation pillow 17 and causing it to inflate prematurely and thereby accelerating the longitudinal deployment of the balloon in the space environment to intolerable levels. Also the chemicals contained in the package 12 are prevented from entering the balloon cavity during storage.

Figure 5:
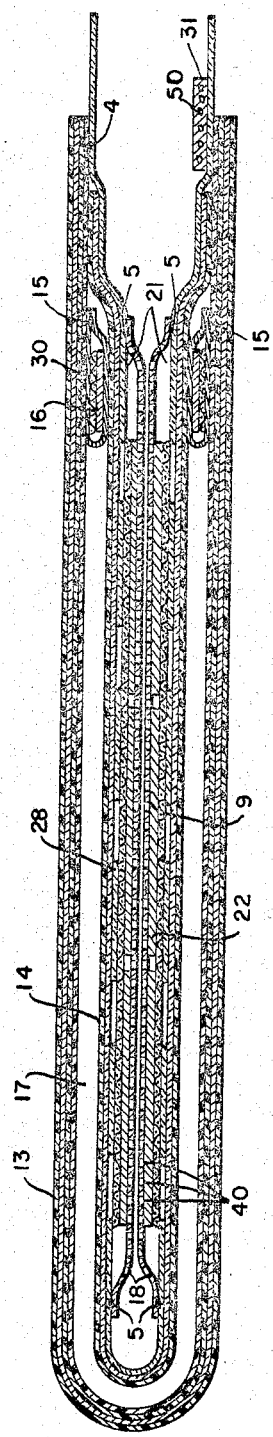
FIGURE 5 is a cross sectional view of the inflation package of FIGURE 2 folded in envelope form.

While in the description presented so far the sublimation wafers 22 are indicated as being positioned directly between the smaller non-porous plastic sheet 14 and the perforated plastic vapor flow control filter 18, they can be packaged as shown in FIGURES 3 and 5, in a subassembly composed of one mil clear polyethylene filter 18, perforated with holes 40 of approximately thirty mils diameter, and a two mil corona treated polyethylene film 28 with a number of one inch diameter holes 29 therein to preclude the formation of another pillow volume, yet permit the packaging of the wafers in a subassembly. In forming the complete assembly, filter 18 and film 28, with the wafers 22 positioned therebetween, are joined together by heat welds 5, as shown in FIGURE 5; and then the subassembly is joined by heat welds 4 to the inflation pillow 17.

When the inflation package 12 is formed in the manner just described, an adhesive wax 31, with glass scrim binder 50, is positioned on the surface of film 28 around one half of the perimeter thereof and retained thereon by a minor application of heat. A showing of the relative location of adhesive wax 31 can be found in FIGURE 2. The corona treatment of the film provides a good surface for bonding the adhesive wax 31. On the other hand, if a subassembly approach is not to be used, then adhesive wax 31 or other sealant would be positioned on outer plastic sheet 13 approximately as shown in FIGURE 4. It is important that the adhesive wax 31 be located far away from the sublimation wafers 22, for example, pyrazole for the correct operation of the inflation system. This is done to preclude the cooling effect of the subliming process, which removes heat from the wafer area, from affecting the melting of the adhesive wax 31. Everything is done to best insure that the adhesive wax 31 will soften evenly so that inflation package 12 will open fully and smoothly.

Adhesive wax 31 is a black compound developed at the Harry Diamond Laboratories and fully described in a copending patent application, Serial No. 403,956 filed October 14, 1964, assigned to the United States Army by the inventors Karl F. Plitt and Allan M. Briggar and entitled, "Adhesive With Temperature Controlled Release Characteristics." This wax softens at approximately 37 degrees centigrade and bears the characteristics of being flexible and heat sealable. In use with inflation package 12, it is reinforced with a glass fiber scrim 50. The entire inflation package 12, as shown in FIGURE 2, is folded about the center line 6 thereof to form a structure in the form of a wallet as illustrated in FIGURE 5. The inflation package 12 is then sealed on its three open sides by a moderate application of heat being applied to the wax 31.

The "gas spring" or inflation pillow 17 is a major contribution to the invention inasmuch as it insures that the inflation package 12 opens completely, i.e., the inflation pillow makes it possible to open the inflation package fully (the wallet unfolds) independently of the inflatant chemical being used.

It might be well to point out that the inflation package 12, due to the "gas spring" or inflation pillow concept, might very well have applications other than that particularly described herein. For example, the inflation package 12 could be used to house reflecting or absorbing surfaces or special equipment, etc., with the inflation pillow 17 assisting in the release thereof. These surfaces or equipment would then be substituted for the inflation material compartment 21, including wafer 22 and perforated plastic sheet 18.

After inflation package 12 is wax sealed, it is placed in a vacuum chamber and any residual air and water vapor within the inflation package is caused to permeate the plastic or, in the preferred embodiment, is pumped away through special unsealed vent tubes 2 (note FIGURE 2 for a showing of the vent tubes) which are subsequently sealed prior to removal from the vacuum environment. In this way, the cleanliness of inflation package 12 and its freedom from unwanted gases and vapors is assured. The inflation packages 12 can then be stored in an evacuated canister until they are ready for installation in the balloon 11. The out-gassing is essential in the case, such as the Echo II balloon, where no initial acceleration from inflation package 12 is to be added during the initial deployment of the balloon via expansion of the residual gas trapped within the folded balloon.

At this time, it might be well to point out that the use of inflation packages has an additional advantage over prior art inflation systems in that any one of them can be readily removed or replaced at any time prior to launch if such a step should become essential as, for example, when one becomes defective or it does not become necessary to use as many as originally intended.

Figure 6:
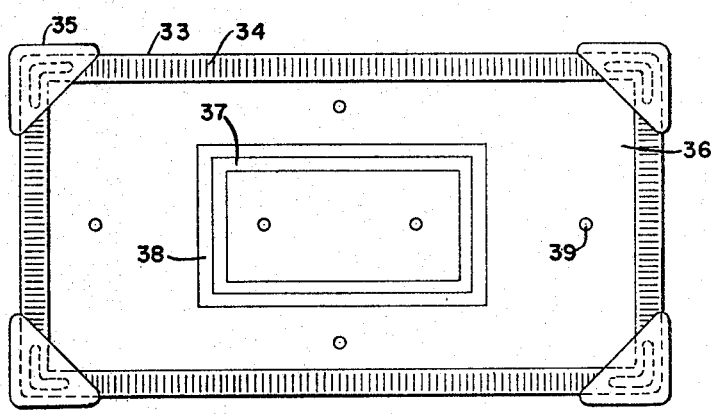
FIGURE 6 shows the means for securing an inflation package to the inner surface of the fabric of the balloon.

The completed wax sealed inflation packages 12 are attached to the inner surface of the balloon, as shown in FIGURE 1, by suitable attachment means. In FIGURE 6 there is shown one example of an attachment means being formed on the inner surface of the balloon fabric for connecting an inflation package 12 thereto. A one inch wide slit double-sided pressure sensitive tape 33 is attached to the balloon interior. Slits 34, formed along the total length of the tape 33, permit uniform elongation of the balloon surface by eliminating stress concentration on the skin and surface discontinuities which would distort the radio frequency reflection characteristics.

A one mil polyethylene attachment sheet 36, with Mylar reinforced vent holes 39, is affixed to tape 33. It is preferable that attachment sheet 36 be transparent to infrared energy to insure that "cold spot" areas will not be set up between the sheet 36 and balloon 11. The vent holes 39 are necessary to allow the outgassing of any entrapped air and water vapor between the balloon 11, the inflation package 12, and the attachment sheet 36. Corner extensions 35 of one half mil Mylar are bonded to and overlay the corners of polyethylene attachment sheet 36 to preclude the possibility of any deleterious interaction between the corners of inflation package 12 and the balloon fabric during the launch environment or deployment.

Figure 7:
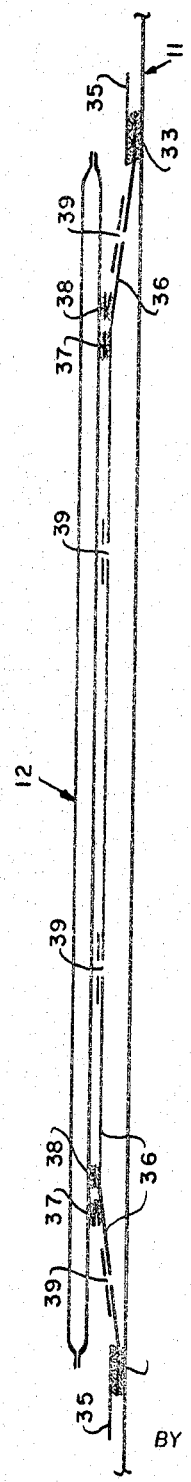
FIGURES 7 and 8 are side and end views, respectively, of an inflation package connected to the balloon prior to inflation of the inflation pillow.
Figure 8:
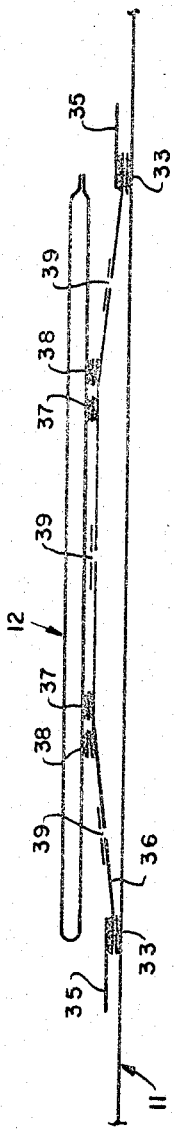

Near the middle of polyethylene sheet 36 is attached a one inch wide double sided pressure sensitive tape 37 surrounded by a one inch wide pressure sensitive folded tape 38. As shown in FIGURES 7, 8, and 9 these two tapes serve as the means for attaching inflation package 12 to the attachment sheet 36. Accordingly then, the attachment sheet 36 with inflation package 12, secured by tapes 37 and 38, is attached to the balloon surface 11 by the tape 33.

OPERATION

The inflation packages 12 which are attached to the inner surface of balloon 11, as described above, are more particularly affixed so that they will be in specific folds and locations within the balloon. For example, seventy-two (72) of the thin inflation packages 12 of approximately one foot by two feet were included within the Echo II balloon structure The completed balloon assembly, by a well known technique is inserted into a canister, which is in turn assembled to a launch vehicle. When the launch vehicle is injected into orbit the canister is separated therefrom. Then, after a predetermined time an explosive separation device permits the release of the balloon satellite from the canister.

Now, with the balloon separated from the canister, it is initially deployed via the residual air trapped within the folded structure. During this initial deployment, it is imperative that the inflation packages 12 remain inert (FIGURES 7 and 8) and thereby prevent any release of vapor from the wafers 22. As the balloon 11 unfolds and distends longitudinally, the increased internal volume inside the balloon results in a rapid reduction in the internal pressure thereof. When the internal pressure drops below the vapor pressure of the activator chemical 16, within the inflation pillow 17, vapor is given off by the activator chemical to expand the inflation pillow 17, and the initially flat inflation package 12 slowly start to swell. The expansion of inflation pillow 17 is controlled by the heat flow into the activator chemical 16 and the temperature-pressure characteristics of the chemical. It might be well to point out that, during the initial deployment of balloon 11, having inflation package 12 therein which have been properly outgassed, the acceleration force acting on an inflatable structure, caused by the inflation material or activator chemical 16, can be held to zero.

As the initial deployment continues, the heat from the sun raises the temperature of balloon 11. This increased temperature causes the activator chemical 16 in inflation pillows 17 to further sublime and start the pressurization of inflation pillows 17. Balloon 11, meanwhile, has been deployed into essentially a round "soft-ball" shape. The temperature of balloon 11 continues to increase due to solar heating, thereby completing the pressurization of the inflation pillows 17 (FIGURE 9). This pressurization results in a peel load being exerted on the wax seals 31. At the same time, the temperature of the wax seals 31 starts to increase to cause softening thereof. As the wax seals 31 soften, the inflation pillows 17 open the inflating packages 12, thereby exposing the inner compartment of inflation packages 12, wherein the inflation sublimation wafers 22 are located, to the environment of the balloon structure as shown in FIGURE 10. As its function is described herein, the sublimation process of wafers 22 is controlled or limited by the pressure exerted by the inflation pillows 17 on the inflation compartment 21, which limits the dilation thereof, and by the wax seal 31, which prevents escape of the vapor from wafers 22 prior to release of the wax seal 31.

The inflation wafers 22 sublime, at a rate controlled by the availablility of local heat and the perforated filter 18, to generate the necessary internal pressure required to produce a smooth rigidized spherical balloon structure. In the case of Echo II, the inflation system pressurized the structure of a skin stress of approximately 4800 pounds per square inch in about thiry (30) minutes.

It should be noted, that depending upon the wax or other material used as a sealant, the opening of inflation package 12 can be readily controlled. For example, if a delayed opening action is desired, cements having a slow yielding adherence can be used to oppose the opening force of inflation pillow 17. On the other hand, the internal pressure acting in the inflation pillow 17 can be made sufficiently large to rupture a permanently sealed inflation package 12. This latter method could be effectively utilized by the judicious selection of activator chemical 16 so that the package rupture will occur when the balloon 11 is fully deployed so that a safe release of the sublimation (pressurization) material will be accomplished.

While the inflation pillow 17 of inflation package 12 has been described as functioning after balloon 11 has been initially deployed by the residual gases within the balloon, in certain instances, it may be used, instead, to accomplish the initial deployment of the balloon. In such application, the pressurization of the inflation pillow 17, by the vapor generated from activator chemical 16, can be used to overcome the large unfolding loads associated with inflatable balloon structures constructed of materials too stiff to be deployed via residual gases inside the structure. Large acceleration forces can be exerted by selecting the number and size of the inflation packages 12 used in the particular application. Additionally, these acceleration forces can be programmed by selecting the correct activator chemical 16 for use in the inflation pillow 17.

In summary, the present invention is an improvement over the prior art since it provides a lightweight inflation system for a balloon type satellite. This inflation system essentially comprises inflation packages 12, each formed as a wallet shaped structure, with the edges thereof sealed by a temperature sensitive wax sealant 31. Each inflation package has two compartments, one acting as an inflation pillow 17, when the activator chemical 16 therein sublimes, and the other providing vapor from sublimation wafers 22 therein, in controlled amounts, to the internal structure of the balloon via perforated plastic sheet 18. In essence, each inflation package 12 remains flat or inert until the balloon is initially deployed by the residual gases therein. Thereafter activator chemical 16 sublimes and inflation pillow 17 expands. At the proper temperature, wax 31 softens. With inflation pillow 17 expanded and wax 31 softening, inflation package 12 is forced opened and vapor is applied to the internal structure of the balloon from sublimation wafers 22 through holes 40 in the perforated plastic sheet 18. In this manner the second step of deployment of the balloon is accomplished and its skin is extended to a permanent set.

While the foregoing disclosure relates to a preferred embodiment of the invention, numerous modifications or alterations may be made therein without departing from the spirit and scope of the invention as set forth in the appended claims.

What is claimed is:

1. An inflation device for a balloon type space vehicle comprising:
    (a) a first thin, soft flexible compartment means,
    (b) a first pressurizing agent located within said compartment means,
    (c) a second, thin soft flexible compartment means of substantially the same dimensions as said first compartment means and attached thereto in a sandwich-like fashion, and
    (d) a second pressurizing agent located within said second compartment means.

2. The inflation device of claim 1 wherein said first compartment means has its non-attached surface perforated with small holes.

3. The inflation device of claim 2 wherein said second compartment means has as its non-attached surface coated black.

4. The inflation device of claim 3 wherein said second pressurizing agent pressurizes the compartment wherein it is located prior to said first pressurizing means releasing a pressure therefrom via said surface perforated with small holes.

5. The inflation device of claim 4 wherein said first and said second compartment means, as attached, are folded to be in a wallet-like form and which further comprises:
    (a) a retention means for maintaining the wallet-like form and preventing it from opening.

6. The inflation device of claim 5 wherein said retention means comprises a means for sealing the three opened sides of said wallet formed structure.

7. The inflation device of claim 6 wherein said sealing means is a temperature sensitive wax.

8. A pressure releasing mechanism comprising:
    (a) a soft, flexible member formed of two compartments,
    (b) a first pressurizing agent contained within one of said two compartments capable of expanding said one of said two compartments, and
    (c) a second pressurizing agent contained within the other of said two compartments for applying pressure external therefrom.

9. The pressure releasing mechanism of claim 8 wherein said flexible member is folded to be in a wallet-like structure with said one of said two compartments formed as the outer surface of said wallet-like structure and which further comprises:
    (a) a retention means for mainating said wallet-like structure and preventing it from opening.

10. The pressure releasing mechanism of claim 9 wherein said retention means comprises a means for sealing the exposed three sides of said wallet-like structure.

11. A release mechanism comprising:
    (a) a soft, flexible compartment means folded as a wallet-type structure,
    (b) a retention means for keeping said flexible compartment means as a folded structure,
    (c) a pressurized agent contained within said compartment means for expanding said compartment means at a desired time, and
    (d) a release means for disengaging said retention means during the period of time that said pressurizing agent is expanding said compartment means.

12. An inflation package comprising:
    (a) a first thin, soft flexible compartment means having a transparent perforated plastic upper member and a transparent plastic lower member;

(b) a sublimation medium housed within said first compartment means;

(c) a second thin, soft flexible compartment means having a transparent plastic upper member and a plastic reinforce lower member, said plastic reinforced lower member having a highly emissive outer surface and a vapor permeability barrier formed as an integral part thereof, said plastic lower member of said second compartment means being connected to said transparent upper member of said second compartment means such that said compartments are connected in a sandwich-like fashion; and (d) an activator chemical housed within said second compartment means.

13. The inflation package of claim 12 wherein said first and said second compartment means, as attached, are folded to be in a wallet-like structure and which further comprises:

(a) a temperature sensitive sealant for sealing the three opened sides of the wallet structure.

14. A method of inflating balloons of the type which are ejected in a folded condition from a capsule in outer space, comprising the steps of:

(a) affixing to the inner surface of said balloon at least one two compartment inflation package folded into a wallet shaped structure with open edges thereof sealed, each compartment thereof having contained therein a pressurizing agent, and one of said compartments capable of having a vapor escaping therefrom upon the opening of said wallet shaped structure;

(b) allowing said balloon, after it has been ejected into space and separated from the canister wherein it was packaged, to be deployed by the residual gas with the balloon;

(c) then, causing pressurizing agent within said outermost compartment of said two compartments to expand said compartment;

(d) while at substantially the same time, unsealing said wall shaped structure; and (e) finally, permitting the vapor to escape from said one of said compartments to deploy said balloon to a permanent set.

15. A method of inflating a balloon type satellite in outer space, comprising the steps of:

(a) placing a sublimating, pressurizing agent within one compartment of a two compartment thin, flexible container having means cooperating with said one compartment for allowing a vapor, escaping from said sublimating agent, to be released from said one compartment;

(b) placing an activator chemical pressurizing agent in the other of said two compartments, (c) folding said container into a wallet form structure with said other of said two compartments being on the outside thereof;

(d) sealing the edges of the exposed portions of said wallet formed structure to maintain the wallet shape thereof; and (e) affixing said wallet formed structure to the inner surface of said balloon before the folding thereof.

No references cited.

MILTON BUCHLER, *Primary Examiner.*

A. H. FARRELL, *Assistant Examiner.*